March 22, 1960 A. A. MILLER 2,929,272
EPICYCLIC CHANGE SPEED GEARING
Filed March 18, 1958
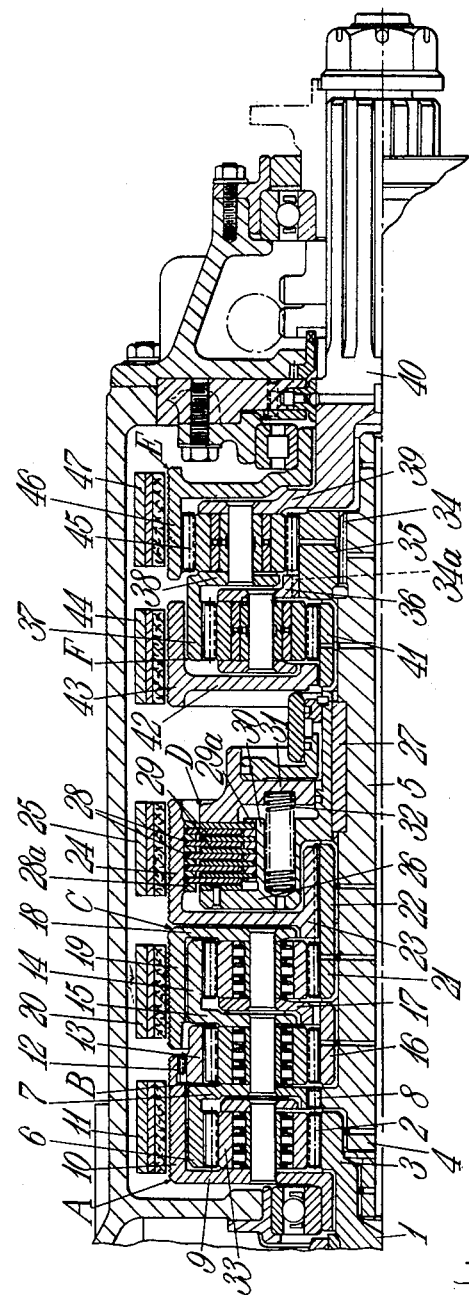
Inventor
A. A. Miller
By Haseltine Downing Diebold
Attys

United States Patent Office 2,929,272
Patented Mar. 22, 1960

2,929,272
EPICYCLIC CHANGE SPEED GEARING

Albert Arthur Miller, Coventry, England, assignor to Self-Changing Gears Limited, Coventry, England Application March 18, 1958, Serial No. 722,310

Claims priority, application Great Britain March 19, 1957

5 Claims. (Cl. 74—759)

This invention relates to epicyclic change speed gearing of the kind comprising epicyclic gear trains controlled by brakes and arranged to provide two or more forward speeds and a reverse. The object of the invention is to provide an improved gearing arrangement affording the advantages of low relative speeds between the gear components and also a small overall ratio as compared with that obtainable with conventional gearing of the kind in question. A further object is to provide such a gearing arrangement of particularly compact construction.

According to the invention a reversing and change speed gearing comprises a first epicyclic gear train adapted to afford a reduced ratio reverse drive, a second epicyclic gear train adapted to be compounded with the first gear train to afford a low forward gear ratio, and a third epicyclic gear train adapted to be compounded with the said first and second gear trains to afford a forward gear ratio intermediate the low gear and a direct drive.

It is to be understood that the compounding of gear trains as referred to above means the driving of the reaction element of one gear train, which is known as the basic train, by means of one or more gear trains.

According to a further feature of the invention one gear element of each of the above mentioned epicyclic trains is connected to an output member or shaft of the gearing, the second gear train being arranged to speed up the reaction gear element of the first train to provide the low gear, and the third gear train being arranged to speed up the reaction gear element of the second gear train and thereby further to speed up the reaction gear element of the first train to afford the intermediate gear ratio, the first or reversing gear train constituting the basic train of the compounded gearing.

According to a further feature of the invention, a clutch is provided for affording a direct or solid drive by locking together two independent gear elements of the epicyclic gearing. In a preferred arrangement the sun gear of the third epicyclic train is locked to the annulus gear of the same, the said annulus gear being connected to the output member or shaft.

According to a further feature of the invention the gearing defined above is combined with an auxiliary gear unit, the output shaft of the three speed and reverse gearing being arranged to constitute an intermediate shaft to the rear end of which are secured the sun gear of a reduction epicyclic gear train and the planet carrier of an overspeed epicyclic gear train.

The figure of the accompanying drawing is a longitudinal section of part of a change speed gear box constructed in accordance with the invention and including an auxiliary gear unit.

In carrying the invention into effect according to one convenient mode as shown in the figure, applied by way of example to a change speed gearing affording a reversing gear and three forward speeds, in combination with an auxiliary gear unit, there are provided three epicyclic gear trains indicated generally at A, B and C, each of which trains includes a sun gear, planet gears, an annulus gear, and a brake for controlling the annulus gear. There is also provided a clutch, preferably of the multiple plate type as indicated at D, arranged to afford a direct drive. An input shaft 1 of the gearing drives a sun gear 2 of the first or reverse gear train A which is located over a hollow or recessed end 3 of the shaft 1. The inner end 4 of an output shaft 5 aligned with the input shaft 1 is located within the recessed end 4 of said input shaft and an internal annulus gear 6 of the first or reverse train A is connected by a radial carrier plate 7 to the output shaft 5 through suitable radial engaging teeth 8. Located over the output shaft 5 and next to the reverse train A is a second epicyclic train B the planet carrier of which is constituted by the aforesaid radial carrier plate 7 of the reverse train annulus gear 6. The planet carrier 9 of the first or reverse train A is rotatable over the input shaft 1 and is formed with a brake drum 10 enclosing said train, a band brake 11 being provided for controlling the said drum. Also the inner end of the brake drum 10 has a radial tooth engagement 12 with an internal annulus gear 13 for the second epicyclic train B. A third epicyclic train C located next to the second train B has an internal annulus gear 14 secured to a radial plate 15 on the planet carrier 7 of the second train B. A sun gear 16 for the second train B is rotatable over the input shaft 5 and is secured to the planet carrier 17 of the third train C, said carrier being secured to a radial plate 18 on the further side of the train C to which is secured a brake drum 19 enclosing the annulus gear 14 of the said third train. A brake 20 is provided for controlling said drum 19. The sun gear 21 of the third train is connected to a sleeve 22 rotatable on the output shaft and said sleeve is connected to a radial flange or plate 23 which carries a brake drum 24 that also constitutes one member of a direct drive clutch. A brake band 25 is provided for controlling said brake drum 24. The second member 26 of the direct drive clutch is connected at 27 to the output shaft 5. In the arrangement shown the clutch is of the multiple plate type and one set of plates 28 is engaged with suitable formations 28a on the inner surface of the brake drum 24 connected to the sun gear 21 of the third train C. The second set of plates 29, interleaved with the first plate set, is engaged with suitable formations 29a on an internal drum 30 secured to the output shaft and there is provided an axially slidable pressure plate 31 for compressing the brake plates against the action of suitably arranged return springs 32.

It will be seen from the foregoing description that the annulus gear 13 of the second train B and the planet carrier 9 of the first train A are connected to a common member or drum 10 controlled by a brake 11, and that the sun gear 16 of the second train B and the planet carrier 17 of the third train C are also connected to a second common member or drum 19 controlled by a brake 20.

The arrangement is such that to obtain a reverse drive the planet carrier 9 of the first train A is held stationary against rotation by applying the brake 11 to its brake drum 10, the drive from the input shaft 1 to the output shaft 5 being reversed through the planet gears 33 acting as idler gears. To obtain the lowest forward gear ratio, the sun gear 16 of the second train B is held stationary by applying the brake 20 to the brake drum 19 connected to the sun gear 16 of the second train and the planet carrier 17 of the third train. The second train B is then compounded with the first train A so that the annulus gear 13 of the second train B and the planet carrier 9 of the first train A will be rotated in the same direction as the input shaft 1 (i.e. a forward direction) at a speed exceeding that of the output shaft 5 and the latter will be rotated, by the planet carrier 7 of the second train B, in a forward direction at a reduced speed in relation to the input shaft 1.

To obtain an intermediate gear ratio the sun gear 21 of the third train C is held against rotation by applying the brake 25 to the brake drum 24 connected with said sun gear 21. The planet carrier 17 of the third train C will then be rotated in a forward direction taking with it the sun gear 16 of the second train B. As a result of this latter motion the speed of rotation of the planet carrier 9 of the first train is increased and the annulus gear 6 of said train (which is connected to the output shaft) is revolved at a forward speed more nearly approaching that of the input shaft 1 than under the previous condition. In these circumstances the first, second and third trains are compounded.

To obtain a direct drive, the clutch D is engaged and thereby connects the sun gear 21 of the third train C to the output shaft 5 and thence to the annulus gear 14 of the third train C. The three epicyclic trains will then revolve as a solid drive to afford the third speed ratio.

The above described gearing is shown as combined with an auxiliary gear unit. In this arrangement the output shaft 5 of the three speed and reverse gearing is arranged to constitute an intermediate shaft, to the outer end of which is secured through connections 34, 34a the sun gear 35 of a reduction epicyclic train E and a planet carrier 36 of an overspeed epicyclic train F. An annulus gear 37 of the overspeed train F is connected to the planet carrier 38 of the reduction train E and said planet carrier 38 is connected through a radial flange 39 to an output shaft 40 which is coaxial with the shaft 5. The sun gear 41 of the overspeed train F is connected by a flange 42 to a brake drum 43 controlled by a brake 44. The annulus gear 45 of the reduction train E is connected with a brake drum 46 controlled by a brake 47. The arrangement is provided by the three speed and reverse gearing, thereby affording in all six forward speeds at least one of which is overspeed, and two reverse reduction ratios.

What I claim is:

1. Epicyclic change speed gearing having input and output shafts and compounded epicyclic gear trains including a basic gear train comprising a sun gear connected to the input shaft, a first annulus gear connected to the output shaft, planet gears meshing with said sun and annulus gears, a first rotatable carrier for said planet gears having means for braking said carrier to provide a reduced ratio reverse drive; a second gear train comprising second planet gears on a second rotatable carrier, said carrier being connected to the first annulus gear, a second annulus gear connected to the first planet carrier and meshing with said second planet gears, and a second sun gear meshing with said planet gears; a third gear train comprising a third annulus gear connected to the said second planet carrier, planet gears on a third rotatable carrier and meshing with said third annulus gear, said third carrier being connected to the said second sun gear, means for braking said third carrier, a third sun gear meshing with the said planet gears, and means for braking said third sun gear, the said second and third gear trains being compounding trains for the basic gear train, and the respective gear trains being dimensioned so that braking of the third planet carrier train and hence also the second sun gear provides a low ratio forward drive, and braking the third sun gear provides a drive having a ratio intermediate that of the aforesaid low forward ratio and a ratio of unity.

2. Epicyclic gearing according to claim 1, including a clutch connected between the third sun gear and the third annulus gear to provide thereby a direct drive.

3. Epicyclic gearing according to claim 1, in combination with an auxiliary gear unit providing at least one additional speed ratio, and a drive connection between the output shaft of the gearing and the input member of said auxiliary gear unit.

4. Epicyclic gearing according to claim 1, in combination with an auxiliary gear unit comprising two brake controllable auxiliary epicyclic gear trains, said auxiliary gear unit having a drive connection with the output shaft of the gearing, said auxiliary epicyclic gear trains being respectively dimensioned as a reduction gear train and an overspeed gear train affording further overall speed ratios which with the said basic train, second gear train, third gear train and a direct drive provide a regular series of forward gear ratios.

5. Epicyclic gearing according to claim 1, further comprising a fourth sun gear secured to the output shaft of the said compounded gear trains, a second output shaft, planet gears meshing with said fourth sun gear and mounted on a fourth planet carrier secured to said second output shaft, a fourth annulus gear meshing with said planet gears, means for braking said fourth annulus gear, a rotatably mounted fifth sun gear, means for braking said fifth sun gear, planet gears meshing with said fifth sun gear and mounted on a fifth planet carrier connected to said first output shaft, a fifth annulus gear meshing with said planet gears and connected to said fourth planet carrier, the said fourth gear elements being dimensioned to constitute a reduction gear and said fifth gear elements being dimensioned to constitute an overspeed gear arranged to afford further overall speed ratios which with the said basic gear train, second gear train, third gear train and a direct drive provide a regular series of forward gear ratios.

References Cited in the file of this patent

UNITED STATES PATENTS

| 1,814,096 | Saki | July 14, 1931 |
| 2,162,785 | Neracher et al. | June 20, 1939 |
| 2,388,204 | Barnes | Oct. 30, 1945 |
| 2,546,378 | Winther | Mar. 27, 1951 |
| 2,551,746 | Iavelli | May 8, 1951 |
| 2,580,891 | Clerk | Jan. 1, 1952 |
| 2,609,706 | Jandasek | Sept. 9, 1952 |
| 2,799,184 | Miller | July 16, 1957 |